United States Patent [19]

Nichols

[11] 4,281,976
[45] Aug. 4, 1981

[54] PELLET AND CHOPPING MACHINE

[76] Inventor: William K. Nichols, P.O. Box 18, Corral, Id. 83322

[21] Appl. No.: 84,356

[22] Filed: Oct. 12, 1979

[51] Int. Cl.³ .......................... A23L 1/01; B28B 1/00
[52] U.S. Cl. ................................ 425/62; 425/147; 425/331
[58] Field of Search ....... 425/147, 62, 331, DIG. 230, 425/311, 309; 56/1; 100/43

[56] References Cited

U.S. PATENT DOCUMENTS

| | | | |
|---|---|---|---|
| 220,275 | 10/1879 | Cormack | 425/331 |
| 1,964,290 | 6/1934 | Krause | 425/331 |
| 2,252,900 | 8/1941 | Shafer | 425/311 |
| 3,069,101 | 12/1962 | Wexell | 425/331 |
| 3,168,057 | 2/1965 | Bliss | 425/331 |
| 3,180,250 | 4/1965 | Johnson et al. | 425/331 |
| 3,244,088 | 4/1966 | Bushmeyer et al. | 425/7 |
| 3,286,660 | 11/1966 | Peterson | 425/7 |
| 3,352,229 | 11/1967 | Morse | 425/7 |
| 3,358,618 | 12/1967 | Vetta | 425/7 |
| 3,362,142 | 1/1968 | Crane et al. | 425/7 |

FOREIGN PATENT DOCUMENTS 47-23163 6/1972 Japan .................................... 425/309

Primary Examiner—Jay H. Woo
Attorney, Agent, or Firm—Graybeal & Uhlir

[57] ABSTRACT

An apparatus forming hay pellets from bales of hay is disclosed. The apparatus comprises a rotatable pellet die having a plurality of axially extending pellet forming holes. The cutter knife disc is secured to one face of the pellet die and carries a plurality of cutter knives aligned with each pellet forming hole. The cutter disc further has openings beneath each cutter knife aligned with each pellet forming hole allowing hay to be urged through each pellet forming hole after it is cut. Means urges a bale of hay into the cutter knife disc such that as the pellet die and cutter knife disc rotate, the bale of hay is cut and urged through the openings in the cutter knife disc into each pellet forming hole for compaction into hay pellets. Means aligned with each pellet forming hole controls the moisture in each hay pellet as it is urged through each pellet forming hole.

7 Claims, 4 Drawing Figures

PELLET AND CHOPPING MACHINE

DESCRIPTION

1. Technical Field

The present invention relates to pellet forming machinery, and more particularly to an apparatus forming pellets from hay while simultaneously controlling the moisture content in the formed pellets.

2. Background Art

The problems encountered in storing, handling and feeding hay in bulk form to farm animals or the like are well known. Various machines and methods producing hay wafers or hay pellets from loose hay or preformed hay bales minimizing these problems are shown in the prior art. One such machine is shown by Morse, U.S. Pat. No. 3,352,229. The disclosed device produces hay wafers from stem and leaf fragments of dried hay by the application of pressure, concurrently with the application of pressure, heat is applied to the dried hay to vaporize any excessive moisture in the hay. The disclosed device has a potential problem in that if the hay becomes too dry, the formed wafers or pellets are easily broken, crumbled, or otherwise damaged in subsequent handling.

Another device for compressing loose hay into pellets is shown by Johnson et al., U.S. Pat. No. 3,180,250. The disclosed device produces pellets by using a ram-die mechanism whereby a ram member forces loose hay toward a die with elongate cavities therein. As with other machines and methods in the prior art, the disclosed device made no provisions for controlling the moisture content in the formed hay pellet. As a result the formed hay pellet either crumbled as a result of insufficient moisture content, or was subject to mold or other damage as a result of too much moisture in the compacted hay.

The present invention solves these problems of the prior art. By utilizing a moisture chamber adjacent the disclosed hay cutting and compaction members, the moisture content of the formed hay pellets can be precisely controlled. The present invention also provides interchangable cutting and compaction members permitting the resulting formed hay pellets to be altered in dimension to more ideally suit the needs of individual users.

SUMMARY OF THE INVENTION

According to one aspect of the present invention, an apparatus forming hay pellets from bales of hay generally comprises a rotatable pellet die having a plurality of pellet forming holes extending axially through the die. A cutter knife disc is secured to one face of the die and carries a plurality of cutter knives on the disc. Each cutter knife is in alignment with each pellet forming hole. The cutter knife disc further has openings disposed beneath each cutter knife being aligned with each pellet forming hole to allow the hay to be urged into each pellet forming hole after being cut. The apparatus further has means to urge a bale of hay into the cutter knife disc such that as the pellet die and cutter knife disc rotate, the bale of hay is cut and urged through the openings in the cutter knife disc into each pellet forming hole for subsequent compaction into hay pellets. Finally, means aligned with each pellet forming hole controls the moisture in each hay pellet as it is urged through each pellet forming hole.

An object of the present invention is to provide an apparatus forming hay pellets of a precise and controllable size.

Another object of the present invention is to provide an apparatus forming hay pellets having a known and controllable moisture content.

A still further object of the present invention is to provide an apparatus forming hay pellets adapted for one man operation.

The foregoing, and other objects, features and advantages of the present invention will become more apparent in light of the detailed description of the preferred embodiment thereof set forth hereafter, and illustrated in the accompanying drawings.

BEST MODE OF CARRYING OUT THE INVENTION

Figure 1:
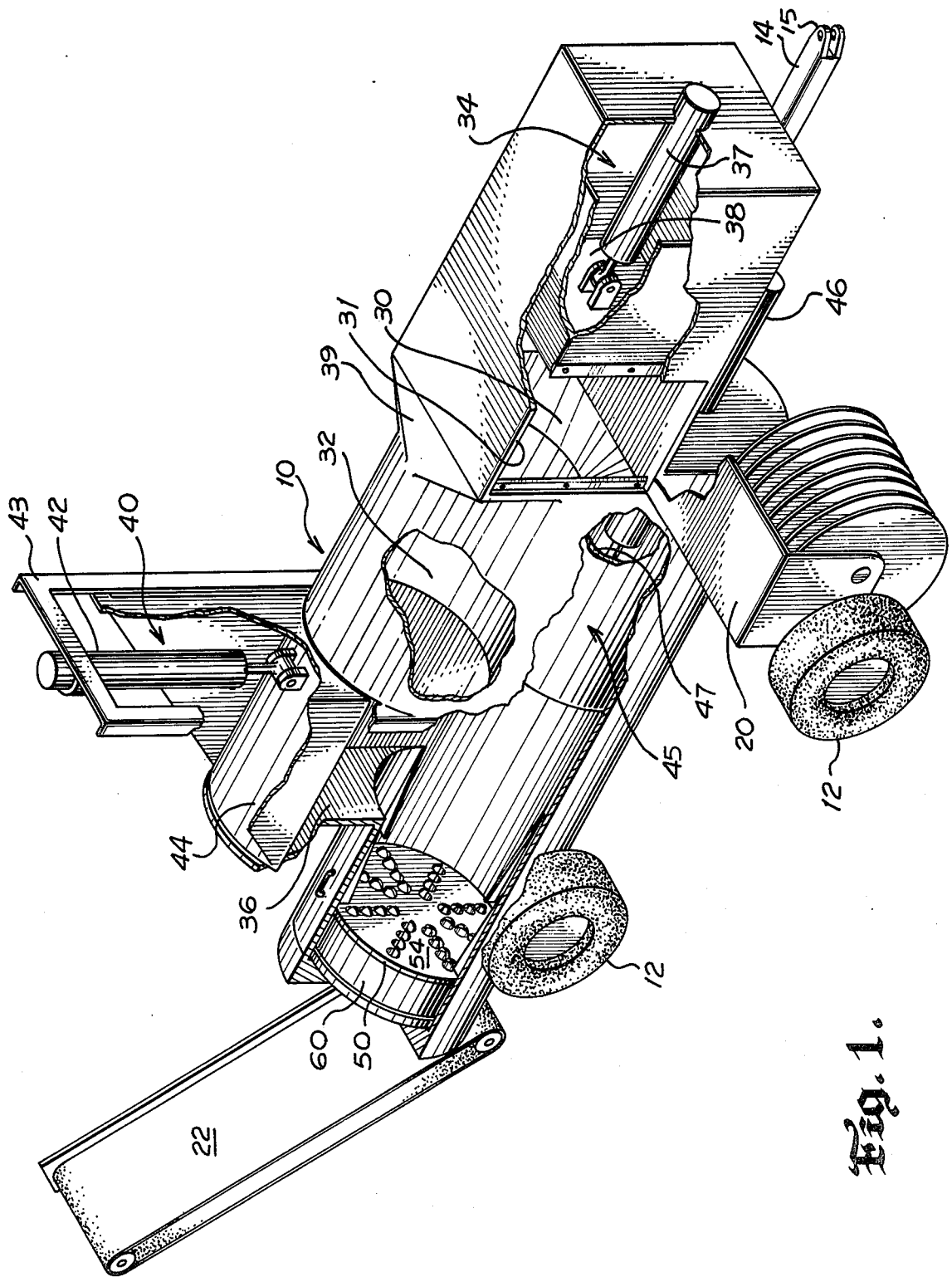
FIG. 1 is a perspective view of a typical embodiment of the present invention with portions shown broken away for clarity.

With reference to FIG. 1, the present invention is carried on a vehicle 10 of the type having feeder means 20 transferring hay or the like from the ground to the vehicle. The vehicle has a plurality of ground engaging wheels 12 enabling the vehicle to move easily over the ground. Disposed at the forward end of the vehicle is a tonque 14 having an adaptor 15 enabling the tongue and the vehicle to be attached to and pulled by typical farm machinery, such as a tractor or the like. In an alternate embodiment of the present invention (not shown) the vehicle 10 contains a power source in driving engagement with the plurality of ground engaging wheels enabling the vehicle to be self-propelled. Disposed at the rearward end of the vehicle is an elevator 22 conveying the hay pellets from the vehicle to other farm machinery, such as a wagon or the like. Means 20 transferring hay from the ground to the vehicle and the elevator 22 are old per se.

Figure 2:
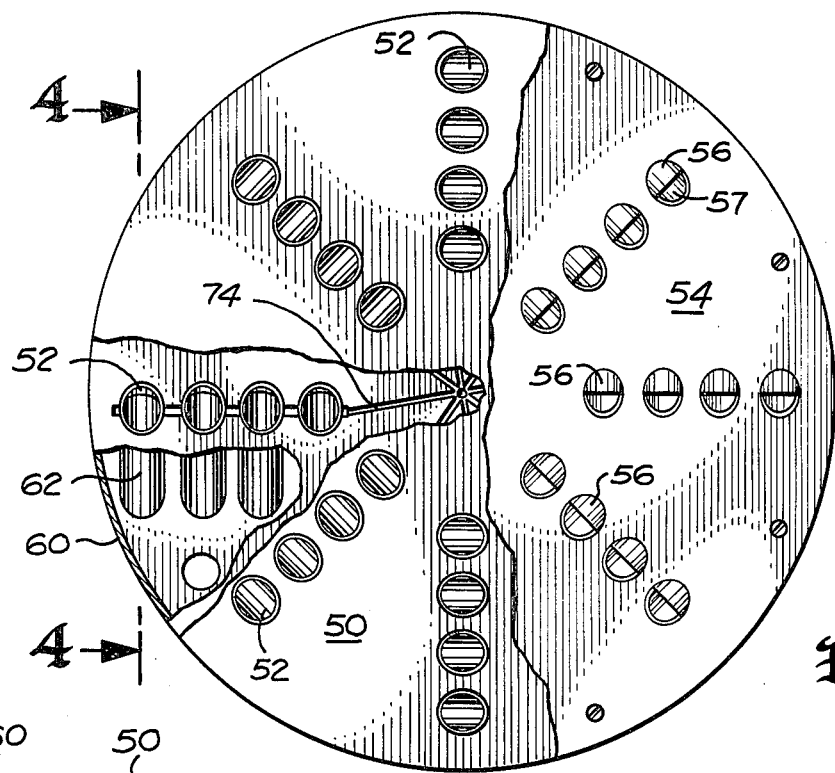
FIG. 2 is a top view of a typical rotatable pellet die and cutter knife disc according to the present invention with portions shown broken away for the sake of clarity.

The present invention, as best shown in FIGS. 1, 2 generally comprises a first feeder chamber 30 forming a bale of hay from the transferred hay with the bale of hay having a substantially rectangular cross section. A second feeder chamber 32 is in communication with the first feeder chamber and forms a bale of hay having a substantially circular cross section. Means, shown generally at 34, carried on the vehicle transfers the bale of hay from the first feeder chamber through the second feeder chamber into a third bale chamber 36.

Figure 4:
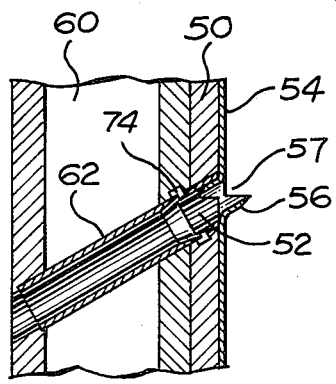
FIG. 4 is a sectional view taken along lines 4—4 in FIG. 2.
Figure 3:
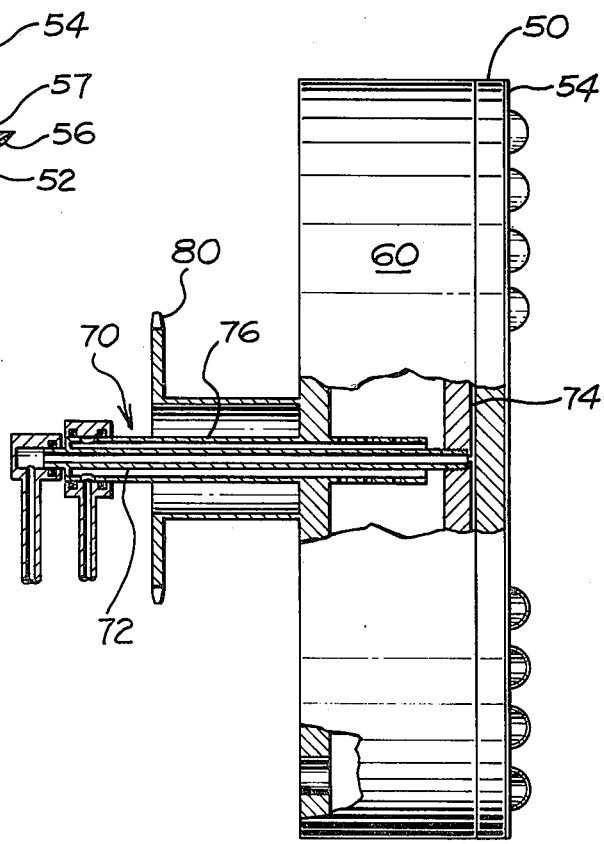
FIG. 3 is a side elevational view of a typical moisture chamber according to the present invention with portions shown broken away.

With reference to FIGS. 2-4, the apparatus for forming hay pellets for bales of hay comprises a rotatable circular pellet die 50 generally disposed adjacent to the third bale chamber. The pellet die has a plurality of pellet forming holes 52 extending axially through the die. A cutter knife disc 54 is secured to one face on the pellet die and carries a plurality of cutter knives 56 in alignment with each pellet forming hole. The cutter knife disc has openings 57 disposed generally beneath each cutter knife and in alignment with each pellet forming hole allowing the hay to be urged into the pellet forming hole after it is cut. A moisture chamber 60 abuts and is secured to pellet die and has a plurality of pellet tubes 62 extending axially therethrough and slightly within each pellet forming hole within the pellet die. The moisture chamber 60 controls the moisture of each hay pellet as it is cut and urged through the tube 62 as will be discussed more fully below. Each of these elements, and others comprising the present invention will next be described in more detail below.

With reference to FIG. 1, the means 34 transferring the bale of hay from the first feeder chamber through the second feeder chamber generally comprises a hydraulic cylinder 37 activated by means (not shown) either on the vehicle or separate and apart from the vehicle. The cylinder typically has an eighteen inch stroke and is movably connected to a square bale plunger 38. As the hay is transferred from the ground to the vehicle and into the first feeder chamber, a knife (not shown) disposed generally across the opening 31 of the first feeder chamber, severs the hay after it has been placed in the first feeder chamber. As the bale of hay is transferred from the first feeder chamber into the second feeder chamber, it is urged through a square bale chamber adaptor 39, typically having a twenty four inch square input and a thirty six inch length, thereby transforming the square bale into one having a generally cylindrical shape. As subsequent bales of hay are urged through the first feed chamber into the second feed chamber, the earlier bales of hay are urged, toward the rearward end of the vehicle and into the third bale chamber. The third bale chamber is typically of a circular shape having a twenty four inch circular opening with a thirty six inch axial length.

Means 40, 45 subsequently urge the bale of hay from the third bale chamber into the cutter knife disc for subsequent cutting and compaction into hay pellets. Means 40 generally comprises a hydraulic cylinder 42 connected to an L-shaped plunger 44 having a saddle shape on one face and a flat surface on the face connected to the plunger. The cylinder is activated by means (not shown) either on the vehicle or separate and apart from the vehicle and is carried on the vehicle by frame 43. Means 45 includes another hydraulic cylinder 56 activated by similar means and in communication with a round bale plunger 47 to urge the bale of hay toward the rear of the vehicle and into the cutter knife disc. In the embodiment shown in FIG. 1, the third bale chamber is of a configuration allowing circular hay bales to be urged axially forwardly from the second bale chamber, then subsequently downwardly by means 40 for subsequent urging into the cutter knife disc by the plunger 47. In another embodiment of the present invention, the third bale chamber is of a configuration allowing a plurality of hay bales to be urged from the third bale chamber into the cutter knife disc in a "ping-pong" manner allowing continuous cutting of a plurality of hay bales.

With reference to FIG. 2, the rotatable circular pellet die 50 is disposed adjacent the third bale chamber. The plurality of pellet forming holes 52 within the pellet die are disposed at an acute angle with respect to each other. The angle of each pellet forming hole can vary from between thirty to forty-five degrees, but it has been found that a thirty degree angle is most optimum. By varying the width of the pellet die, the pellet forming holes vary enabling the length of the subsequent pellet to be altered to fit the specific needs of the vehicle operator. In an alternate embodiment, an insert tube has axially decreasing side walls in the axial direction of the pellet die and enables the pellet die to further compress the cut hay as it is urged through the pellet forming holes.

The cutter knife disc 54 secured to one face of the pellet die carries a plurality of cutter knives 56 each being aligned with each pellet forming hole. Disposed beneath the cutter knives are a plurality of openings 57 also aligned with each pellet forming hole allowing the hay to be urged through the cutter knife disc into the pellet forming hole after the hay has been cut. In another embodiment of the present invention, the cutter knife disc carries a plurality of cutter knife pairs extending above and below the disc, with each pair of cutter knives being aligned with each pellet forming hole. In this embodiment, each cutter knife has the reverse shape of the other cutter knife (see FIG. 4) with one cutter knife extending within a pellet forming hole while its corresponding pair extends above the pellet forming hole. The cutter knife disc then may be invertably secured to the pellet die whenever one set of cutter knives becomes dulled or otherwise impaired. As in the first embodiment, disposed beneath pairs of cutter knives is an opening allowing the hay to be urged through the cutter knife disc into the pellet forming holes after the hay has been cut. In either embodiment, the knives on the cutter knife disc have a cutting edge being at the same angle with respect to the cutter knife disc as each pair of pellet forming holes are with respect to the pellet die. In like manner, it has been found that a cutting edge of about thirty degrees with respect to the cutter knife disc has been found most optimum. With reference to FIG. 2, each cutter knife in either embodiment is off-set with respect to adjacent cutter knives enabling the cutter knives to cleanly and more efficiently cut a bale of hay.

A moisture chamber 60 abuts and is secured to the pellet die. The moisture chamber has a plurality of pellet tubes 62 extending therethrough with each pellet tube being aligned with each pellet forming hole in the pellet die. As the cut hay is urged through the pellet forming holes 52 and compacted into pellets, the pellets are subsequently urged into the pellet tubes where the moisture content of the formed pellets is altered to suit the needs of the particular user.

As best shown in FIG. 3, the moisture controlling means generally comprises a first elongate tube 72 being in communication with a source of liquid (not shown) carried by the vehicle. The first elongate tube is also in communication with a plurality of delivery tubes 74 disposed within the moisture chamber and configured to be in communication with each of the pellet tubes. The delivery tubes deliver a supply of liquid within each pellet tube as each hay pellet is urged through same. A second elongate tube 76 extends around and is spaced apart from the first elongate tube and is in communication with a source of heated air (not shown) carried by the vehicle. When heated air is in the space between the first and second tubes, the liquid within the first elongate tube is converted into steam to add moisture to the hay pellets as they are urged through the pellet tubes. To dry the hay pellets, heated air in the space between the first and second elongate tubes is communicated within the moisture chamber to subsequently surround each pellet tube and dry the hay pellets as they are urged through same.

What is claimed is:

1. In an apparatus for forming hay pellets from bales of hay, such apparatus having means for urging a bale of hay through a bale chamber, the improvement comprising:

a pellet forming die plate disposed within the bale chamber to rotate about a center, said die plate including;
  a front face disposed towards the bale of hay,
  a rear face disposed opposite said front face, and
  a plurality of elongate pellet forming bores extending diagonally through said die plate from said front face to said rear face, with each of said bores having an entrance opening at said front face and an exit opening at said rear face, said exit opening trailing said entrance opening relative to the direction of rotation of said die plate;

a cutter knife disc secured to the front face of said die plate for cutting said hay away from the bale prior to entry into said die plate bores, said disc;
  being substantially thinner than the thickness of said die plate,
  carrying a plurality of cutter knives each in alignment with a corresponding die plate bore, with each knife having a cutting edge disposed at the same angle with respect to the cutter knife disc as the die plate bore is disposed with respect to said die plate; and
  having an opening beneath each of said cutter knives in alignment with the corresponding pellet forming bore to allow hay to be urged into each pellet forming bore by the urging means after being cut by said cutter knives;

an elongate pellet compressing tube removably disposed in communication with each of said die plate bores for receiving cut hay from said bores for further compression within said tubes, each of said compressing tubes;
  being aligned with a corresponding pellet forming bore,
  having a forward end portion inset into the rear face portion of said die plate, and
  imposing frictional drag on the hay as the hay passes through said tube to thereby further compress the hay; and means for supporting said pellet compressing tubes in alignment with corresponding die plate bores.

2. The improvement according to claim 1, wherein:

said means for supporting said compressing tubes in alignment with said pellet forming bores includes a substantially closed chamber encasing said tubes and secured to said die plate, said chamber having a front wall portion abutting the rear face of said die plate and supporting the forward end portions of said tubes, and a rear wall portion spaced from said chamber front wall portion and supporting the rear end portions of said tubes; and further comprising means for controlling the moisture content of the hay pellets as they are urged through said compressing tubes, said moisture control means including;

hot air delivery means in communication with an external supply of heated air for introducing hot air into said chamber to circulate around said compressing tubes, and liquid delivery means interconnecting an external supply of liquid with the forward end of each of said tubes, said liquid delivery means being in heat flow communication with said hot air delivery means such that the liquid flowing through said liquid delivery means is converted into steam prior to reaching said compressing tubes to thereby add moisture in the form of steam to the cut hay as it enters into said compressing tubes.

3. The improvement according to claim 2, wherein:

said liquid delivery means includes an elongate moisture delivery tube in communication with said external liquid supply, and a plurality of passageways formed in said chamber front wall, said passageways interconnecting said moisture delivery tube with the forward end portions of said compressing tubes; and said hot air delivery means includes an elongate air delivery tube extending along and coaxially around said moisture delivery tube, said air delivery tube having an inlet end portion in communication with said external hot air source and having a discharge end portion in communication with the interior of said chamber.

4. The improvement according to claim 1, wherein the interior of said compressing tubes is tapered from the first to the second end portions of said tubes to further compress the cut hay as it is urged through said compressing tubes.

5. The improvement according to claim 1, wherein said cutter knife disc:

carries a plurality of cutter knife pairs, with;
  the cutter knives of each pair formed in reverse shape of each other, and one cutter knife of each pair extending above said disc and the other cutter knife extending below said disc, and
  each pair of cutter knives being aligned with a corresponding pellet forming bore so that one knife of each pair extends within the bore while the other knife in each pair extends above the bore, thereby enabling said disc to be invertably secured to said die plate; and said disc further includes an opening located between said cutter knife pairs in alignment with a corresponding pellet forming bore to thereby allow hay to be urged into the bore after being cut by said cutter knife of each pair extending above said disc.

6. The improvement according to claim 1, wherein the longitudinal axis of each pellet forming bore is disposed at an angle from 30 to 45 degrees with respect to the rotational axis of said pellet die plate.

7. The improvement according to claim 1, wherein the means for urging a bale of hay through the bale chamber and into said cutter knife disc includes a plurality of webs pressing into the bale to hold the bale against rotation relative to the bale chamber as said cutter knife disc and said pellet die plate rotate.

* * * * *